(No Model.)
R. J. HOWARD
TENDER GATE.
No. 422,527. Patented Mar. 4, 1890.
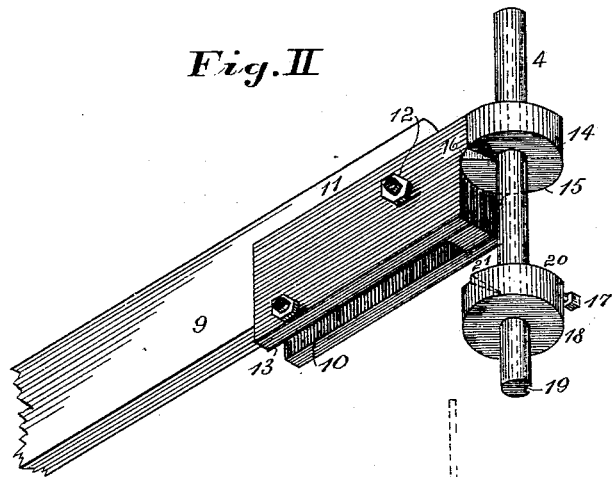
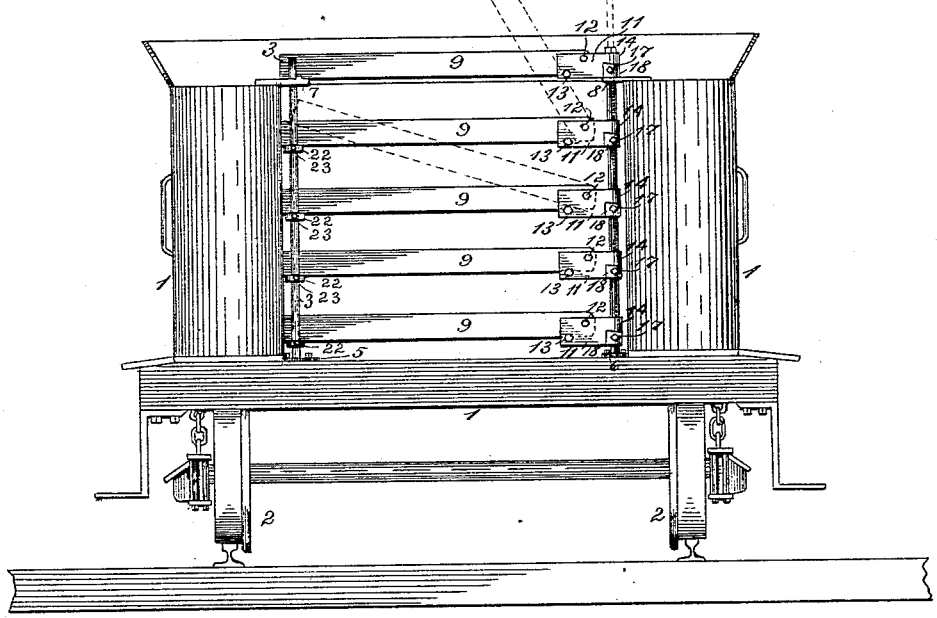
Attest
E. Arthur
W. E. Knight
Inventor
Ryker J. Howard
By Knight Bros.
Attys.

United States Patent Office.

RYKER J. HOWARD, OF LA JUNTA, COLORADO, ASSIGNOR OF ONE-HALF TO JOHN W. TAMPLIN, OF SAME PLACE.

TENDER-GATE.

SPECIFICATION forming part of Letters Patent No. 422,527, dated March 4, 1890.

Application filed March 11, 1889. Serial No. 302,785. (No model.)

*To all whom it may concern:*

Be it known that I, RYKER J. HOWARD, of La Junta, in the county of Bent and State of Colorado, have invented certain new and useful Improvements in Tender-Gates, &c., of which the following is a full, clear, and exact description, reference being had to the accompanying drawings, forming a part of this specification, and in which—

Figure I is a front elevation of a railroad-locomotive tender, showing my invention attached thereto. Fig. II is an enlarged detail perspective view of one of the bars and its connection.

My invention relates to a gate for railroad-locomotive tenders, &c.; and my invention consists of features of novelty hereinafter described, and pointed out in the claims.

Referring to the drawings, 1 represents the usual tender or locomotive-tender in common use on railroads, and 2 the trucks on which it is supported.

3 4 represent vertical rods or posts, which are secured to the tender by means of plates 5 6 and brackets 7 8.

9 represents a series of bars or a gate, which when closed, as shown in Fig. I, extends in a transverse direction across the front of the tender between the posts 3 4, thus preventing the loss of coal or other material confined in the tender when such material is dislodged by the motion of the train. The bars 9 are hinged in mortises 10 of a series of brackets 11 by a series of bolts 12, said bolts and mortises permitting of a vertical movement of the bars.

13 represents a series of bolts which pass through the brackets 11, and which limit the downward movement of the bars. Integral with the brackets 11 are collars 14, which encircle the post 4, permitting a movement in a horizontal plane of the bars 9 and the brackets 11. The lower sides of the collars 14 are provided with inclined faces 15 and offsets 16. Secured to the post 4 by means of set-screws 17 are a series of collars 18.

19 represents a groove in the post 4, (see Fig. II,) in which the set-screws engage, said groove preventing the turning of the collars 18 on the post. The upper sides of the collars 18 are provided with inclined faces 20 and offsets 21, which correspond with inclined faces and offsets on the collars 14.

22 represents a series of collars located upon the post 3, said collars being made adjustable vertically by means of set-screws 23.

The collars 22 serve to support the free ends of the bars 9.

In operation, when it is desired to adjust the bars vertically, the same is readily accomplished by moving the collars 18 and 22 either up or down and securing them at the desired point by means of the set-screws attached thereto. When there is no material in the tender to prevent so doing, all of the bars of the gate may be opened or swung around in a horizontal plane at the same time, or each individual bar may be swung around in a horizontal plane by itself, or raised in a vertical direction and then swung around, as shown in the dotted lines in Fig. I. When the bars have been swung back to their limit, the offsets 16 on the collars 14 will drop down and engage the offsets 21 on the collars 18, thus holding the bars in said position. When it is desired to close the bars or gate, all that is necessary to do is to raise the bars slightly until the offsets on the collars are out of engagement with each other, thus permitting the bars to swing around on the post.

I have described my invention as applied to a locomotive-tender; but I do not confine myself to this use alone, as it may be used for car-doors and in various other places.

I claim as my invention—

1. In a tender-gate, &c., the combination of the posts and a series of bars hinged to one of said posts, each of the bars being capable of being moved in either a perpendicular or in a horizontal direction independent of the other bars, substantially as described, and for the purpose set forth.

2. In a tender-gate, &c., the combination of the posts, a series of bars hinged to a series of brackets, said brackets being pivoted to one of the posts and provided with mortises in which said bars are secured, and a bolt for securing the bars in said mortises, substantially as described, and for the purpose set forth.

3. In a tender-gate, &c., the combination of the posts 3 4, suitably secured to the tender, a series of brackets 11, pivoted to the post 4 by means of collars 14 on said brackets, a series of bars suitably secured to the brackets, each of said bars being movable independently of the other, and collars 18 on the post 4, for supporting said brackets, substantially as described, and for the purpose set forth.

4. In a tender-gate, &c., the combination of the posts 3 4, secured to the tender, brackets 11, pivoted to the post 4, bars 9, pivoted to the brackets, and adjustable collars 18 22 on the posts, substantially as described, and for the purpose set forth.

5. In a tender-gate, &c., the combination of the post 4, brackets 11, bars 9, supported by said brackets, rotatable collars 14 on said brackets, said collars 14 being provided with inclined faces on their under side, and collars 18, said collars 18 being provided with inclined faces on their upper sides, substantially as described, and for the purpose set forth.

6. In a tender-gate, &c., the combination of the post 4, secured to the tender, said post having a groove 19 extending in a vertical direction, brackets 11, pivoted to the post, bars 9, pivoted to the brackets, collars 14 18 on the post, said collars being provided, respectively, with inclined faces 15 20 and offsets 16 21, and means for adjusting the collars 18 on the post 4, substantially as described, and for the purpose set forth.

RYKER J. HOWARD.

Witnesses:
  JAS. E. KNIGHT,
  M. H. KNIGHT.